(12) United States Patent
Ito et al.

(10) Patent No.: US 10,573,180 B2
(45) Date of Patent: Feb. 25, 2020

(54) VEHICLE CONTROL DEVICE AND VEHICLE CONTROL METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Yosuke Ito, Kariya (JP); Akitoshi Minemura, Kariya (JP); Shogo Matsunaga, Kariya (JP); Jun Tsuchida, Okazaki (JP); Masayuki Shimizu, Numazu (JP); Wataru Ike, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 241 days.

(21) Appl. No.: 15/736,661

(22) PCT Filed: Jun. 16, 2016

(86) PCT No.: PCT/JP2016/067896
§ 371 (c)(1),
(2) Date: Dec. 14, 2017

(87) PCT Pub. No.: WO2016/204213
PCT Pub. Date: Dec. 22, 2016

(65) Prior Publication Data
US 2018/0174461 A1    Jun. 21, 2018

(30) Foreign Application Priority Data

Jun. 16, 2015   (JP) .................................. 2015-121397
Jun. 3, 2016    (JP) .................................. 2016-112096

(51) Int. Cl.
*G08G 1/16* (2006.01)
*B60T 8/172* (2006.01)
(Continued)

(52) U.S. Cl.
CPC ............... *G08G 1/166* (2013.01); *B60T 7/22* (2013.01); *B60T 8/172* (2013.01); *G08G 1/0137* (2013.01);
(Continued)

(58) Field of Classification Search
CPC combination set(s) only.
See application file for complete search history.

(56) References Cited

U.S. PATENT DOCUMENTS

2009/0135065 A1   5/2009   Tsuchida et al.
2009/0251355 A1   10/2009  Nanami

FOREIGN PATENT DOCUMENTS

JP   2001-260703     9/2001
JP   2005-145396 A   6/2005
(Continued)

*Primary Examiner* — Redhwan K Mawari
(74) *Attorney, Agent, or Firm* — Knobbe, Martens, Olson & Bear, LLP

(57) ABSTRACT

A vehicle control device generates a fusion target by fusion of a radar target of an object ahead of the own vehicle acquired as a reflected wave of a carrier wave and an image target of the object acquired by image processing of an acquired image of a region ahead of the own vehicle and performs vehicle control of the own vehicle for the object detected as the fusion target. The vehicle control device determines whether a state where the object is detected with the fusion target has transitioned to a state where the object is detected with only the radar target; determines whether a distance to the object is a predetermined short distance when the state is determined to have transitioned to the state where the object is detected with only the radar target; and performs the vehicle control for to the object when the distance (Continued)

to the object is determined to be the predetermined short distance.

16 Claims, 8 Drawing Sheets

(51) Int. Cl.
*G08G 1/01* (2006.01)
*B60T 7/22* (2006.01)
*G08G 1/04* (2006.01)
*G08G 1/052* (2006.01)

(52) U.S. Cl.
CPC .......... *B60T 2201/022* (2013.01); *G08G 1/04* (2013.01); *G08G 1/052* (2013.01)

(56) References Cited

FOREIGN PATENT DOCUMENTS

| | | |
|---|---|---|
| JP | 2007-226680 A | 9/2007 |
| JP | 2008-132867 | 6/2008 |
| JP | 2008-132867 A | 6/2008 |
| JP | 2014-067169 | 4/2014 |
| JP | 2014-067169 A | 4/2014 |
| JP | 2014-117995 | 6/2014 |
| JP | 2014-117995 A | 6/2014 |

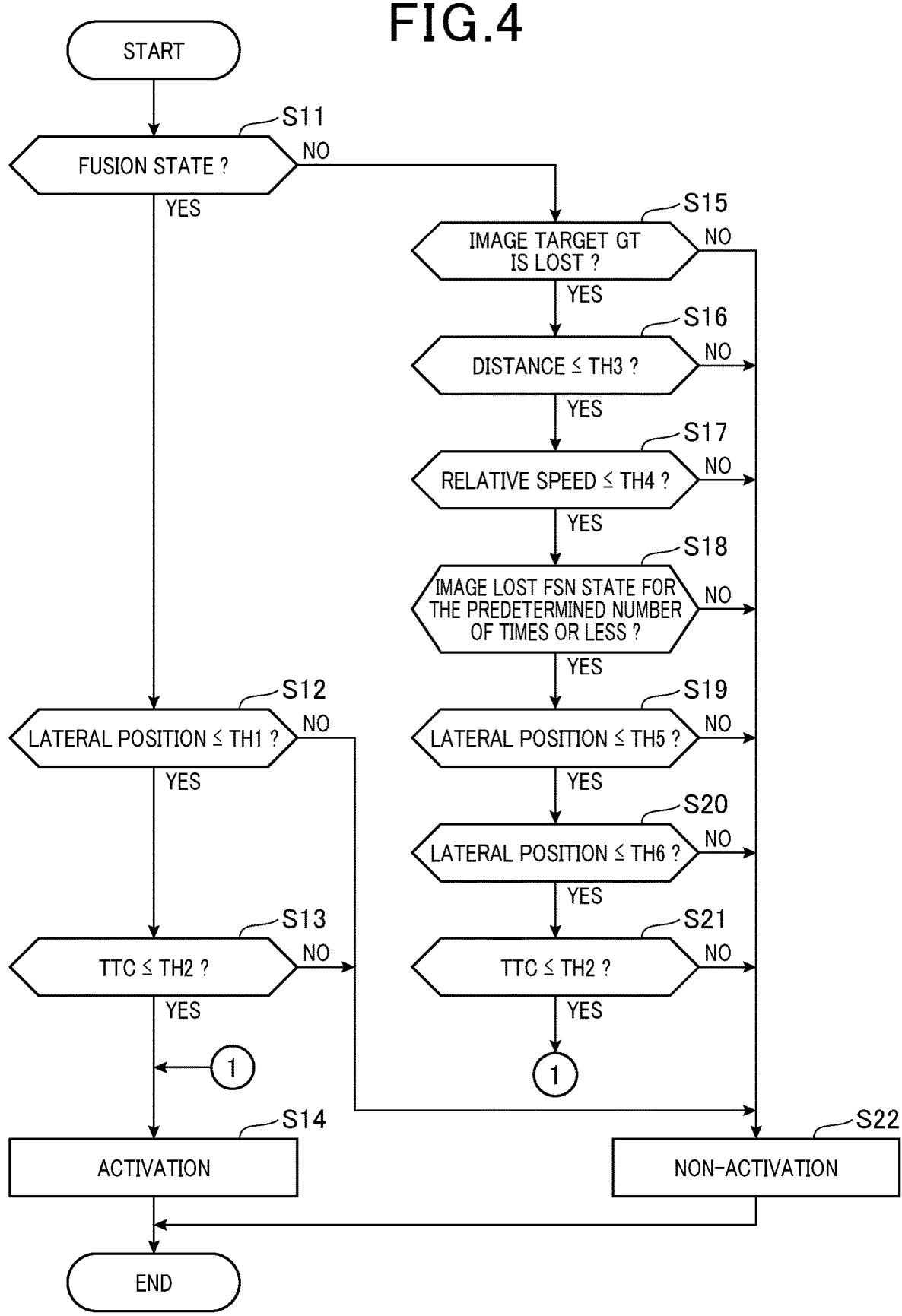

VEHICLE CONTROL DEVICE AND VEHICLE CONTROL METHOD

CROSS-REFERENCE TO RELATED APPLICATIONS

This application is based on Japanese Patent Application No. 2015-121397 filed on Jun. 16, 2015 and Japanese Patent Application No. 2016-112096 filed on Jun. 3, 2016, the contents of which are incorporated herein by reference.

TECHNICAL FIELD

The present invention relates to a vehicle control device which performs vehicle control with respect to an object ahead of the own vehicle and a vehicle control method.

BACKGROUND ART

A technique has been known in which a radar target acquired by a radar sensor is compared with an image target acquired by an image sensor and when it is determined that the radar target and the image target are based on the same object, a new target (fusion target) is generated by fusion of the radar target and the image target. The generation of the fusion target makes it possible to improve accuracy in recognition of an object such as a preceding vehicle ahead of the own vehicle. By using information on a position of the object identified with use of the fusion target, vehicle control of the own vehicle with respect to the object can be performed appropriately (see Patent Literature 1).

CITATION LIST

Patent Literature

[PTL 1] JP 2005-145396 A

SUMMARY OF THE INVENTION

Technical Problem

When the own vehicle approaches the object, however, a part (lower end) of the object goes out of a photographic angle of view of the image sensor and this may prevent the generation of the fusion target. In such a case, the vehicle control with respect to the object identified with use of the fusion target cannot be performed.

The present invention has been made in view of the above point and a main object of the present invention is to provide a vehicle control device which is capable of appropriately performing vehicle control with respect to an object ahead of the own vehicle and a vehicle control method.

Solution to Problem

A vehicle control device in accordance with an aspect of the present invention is a vehicle control device which generates a fusion target by fusion of first target information on an object ahead of the own vehicle and second target information on the object and performs vehicle control of the own vehicle with respect to the object detected as the fusion target, the first target information being acquired as a reflected wave of a carrier wave, the second target information being acquired by image processing of an acquired image of a region ahead of the own vehicle, the vehicle control device including: a state determination section which determines whether a state where the object is detected with use of the fusion target has transitioned to a state where the object is detected with use of only the first target information; a distance determination section which determines whether a distance to the object is a predetermined short distance when the state determination section determines that the state has transitioned to the state where the object is detected with use of only the first target information; and a vehicle control section which performs the vehicle control with respect to the object when the distance determination section determines that the distance to the object is the predetermined short distance.

According to the present invention, when it becomes impossible to acquire the second target information and thus the state where the object has been detected as the fusion target has transitioned to the state where the object is detected with use of only the first target information, the vehicle control with respect to the object is performed on condition that the distance to the object is the predetermined short distance. This makes it possible to perform the vehicle control with respect to an object having high reliability, even after the object becomes undetected as the fusion target.

BRIEF DESCRIPTION OF THE DRAWINGS

FIG. 4 is a flow chart of vehicle control.

DESCRIPTION OF THE EMBODIMENTS

The following description will discuss in more details embodiments of the present invention with reference to the accompanying drawings. However, the present invention can be implemented in many different forms and should not be interpreted to only lie within the limits of the embodiments described in the Description. The embodiments are rather provided in order to thoroughly and completely disclose the present invention and completely convey the scope of the present invention to a person having ordinary (First Embodiment)

A vehicle control system 100 in accordance with the present embodiment is provided in a vehicle, detects an object located ahead of the vehicle, and functions as a pre-crash safety system (PCS) which performs various types of control in order to avoid a collision with the object or reduce damage from the collision. In the following description, a vehicle equipped with the vehicle control system 100 is referred to as own vehicle.

Figure 1A:
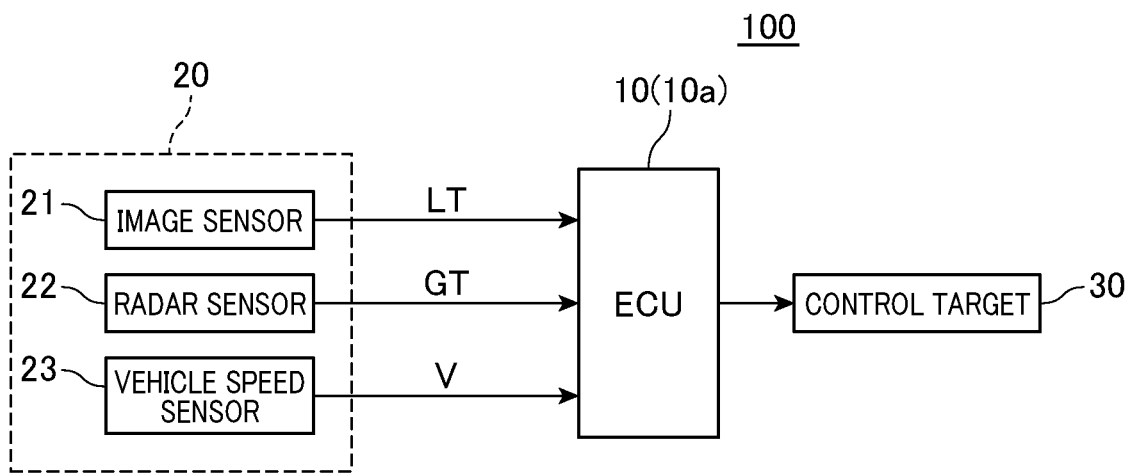
FIG. 1A is a schematic structure diagram of a vehicle control device of first and second embodiments.

In FIG. 1A, the vehicle control system 100 includes an ECU 10, various sensors 20, and a control target 30.

As the various sensors 20, for example, an image sensor 21, a radar sensor 22, a vehicle speed sensor 23, and the like are included.

The image sensor 21 is a CCD camera, a monocular camera, a stereo camera, or the like and is provided, for example, near an upper edge of a windshield of the own vehicle. At each predetermined time, the image sensor 21 photographs a region extending over a predetermined range toward an area ahead of the own vehicle and acquires an acquired image. The image sensor 21 acquires an object ahead of the own vehicle as target information (image target GT) by image processing of the acquired image and outputs the target information to the ECU 10.

The image target GT includes information such as a lateral width of the object in addition to a distance to the object and a relative speed to the object in a direction of travel of the own vehicle and a lateral position of the object indicating a position of the object in a vehicle width direction of the own vehicle. Accordingly, ECU 10 recognizes the image target GT as information having a predetermined width.

The radar sensor 22 detects an object ahead of the own vehicle as target information (radar target LT) by using a directional electromagnetic wave such as a millimeter wave or laser. The radar sensor 22 is provided in a front part of the own vehicle such that an optical axis of the radar sensor 22 is directed ahead of the vehicle. At each predetermined time, the radar sensor 22 scans, with use of a radar signal, a region extending over a predetermined range toward an area ahead of the own vehicle and receives an electromagnetic wave reflected by a surface of an object outside the vehicle. By doing this, the radar sensor 22 acquires a distance to the object, a relative speed to the object, and the like as target information and outputs the target information to the ECU 10.

The radar target LT includes information such as a distance to the object and a relative speed to the object in the direction of travel of the own vehicle and a lateral position of the object indicating a position of the object in the vehicle width direction of the own vehicle. The radar target LT corresponds to first target information and the image target GT corresponds to second target information.

The vehicle speed sensor 23 is provided on a rotating shaft which transmits power to a wheel of the own vehicle. On the basis of a rotational speed of the rotating shaft, the vehicle speed sensor 23 obtains an own vehicle speed which is a speed of the own vehicle.

The ECU 10 is an electronic control unit which controls the whole vehicle control system 100. The ECU 10 is mainly constituted by a CPU and includes a ROM, a RAM, and the like. The ECU 10 detects an object (vehicle, road obstacle, or another vehicle) ahead of the own vehicle by fusion of the image target GT and the radar target LT.

More specifically, the ECU 10 identifies a position of a fusion target in the direction of travel of the own vehicle on the basis of the distance and relative speed of the radar target LT and identifies a position of the fusion target in the vehicle width direction of the own vehicle on the basis of the lateral width and lateral position of the image target GT. Thus, when a fusion target is generated with use of the radar target LT and the image target GT and a position of the object is identified on the basis of the fusion target, the position of the object is identified with use of more accurate one of the information acquired by the radar sensor 22 and the information acquired by the image sensor 21. This makes it possible to improve accuracy in recognition of the position of the object.

By performing well-known image processing such as template matching with respect to the acquired image acquired from the image sensor 21, the ECU 10 identifies a type (another vehicle, pedestrian, road obstacle, or the like) of the object detected as the image target GT. According to the present embodiment, as templates for identifying a type of each object, the ROM stores a plurality of dictionaries which are image patterns indicating characteristics of respective objects. As the dictionaries, the ROM stores both of a whole-body dictionary in which an overall characteristic of the object is put into a pattern and a half-body dictionary in which a partial characteristic of the object is put into a pattern. The information on the type of the object recognized by the image sensor 21 is also inputted into the ECU 10.

According to the present embodiment, accuracy in recognition of the object is improved by generating a fusion target on condition that the type of the object detected as the image target GT has been identified with use of the whole-body dictionary. That is, when the object has low reliability such as when the type of the object detected as the image target GT has been identified with use of only the half-body dictionary, the image target GT is not used for generating a fusion target.

The ECU 10 determines whether there is a possibility that the own vehicle collides with the object recognized as the fusion target. More specifically, from the lateral position of the fusion target and the lateral position of the image target GT, the ECU 10 selects, as a lateral position to be controlled, a lateral position closest to the own vehicle. On the basis of the selected lateral position of the object and an approaching state with respect to the own vehicle, the ECU 10 determines whether there is a possibility that the own vehicle collides with the object.

When the ECU 10 determines that there is a possibility that the own vehicle collides with the object, the ECU 10 calculates time to collision (TTC) with the object, for example, by dividing a distance between the object and the own vehicle in the direction of travel of the own vehicle by a relative speed to the object. The relative speed is obtained by subtracting a vehicle speed of the own vehicle from a vehicle speed of a preceding vehicle. The TTC is an evaluation value indicating the number of seconds after which the own vehicle collides with the object when the own vehicle continues to travel at a current own vehicle speed. Shorter TTC indicates a higher collision risk, and longer TTC indicates a lower collision risk. The TTC can also be calculated by taking into account relative acceleration.

The ECU 10 compares the TTC with an activation timing of each control target 30 and when the TTC is not more than the activation timing, the ECU 10 activates the corresponding control target 30.

As the control target 30, a loudspeaker, a seat belt, a brake, and the like are provided and a predetermined activation timing is set for each control target 30. Accordingly, the ECU compares the TTC with the activation timing of each control target 30 and when the TTC becomes not more than the activation timing, the ECU activates the corresponding control target 30.

More specifically, when the TTC becomes not more than the activation timing of the loudspeaker, the loudspeaker is activated so that an alarm is issued to a driver. When the TTC becomes not more than the activation timing of the seat belt, control is performed so that the seat belt is rolled up. When the TTC becomes not more than the activation timing of the brake, control is performed so that automatic braking is activated to reduce a collision speed. Thus, a collision between the own vehicle and the object is avoided or damage from the collision is reduced.

When the own vehicle approaches the object in a state where the object has been recognized as the fusion target, a lower end of the object goes out of a photographing range of the image sensor 21 and the object may thus become unrecognized as the fusion target (image target GT is lost).

Figure 2:
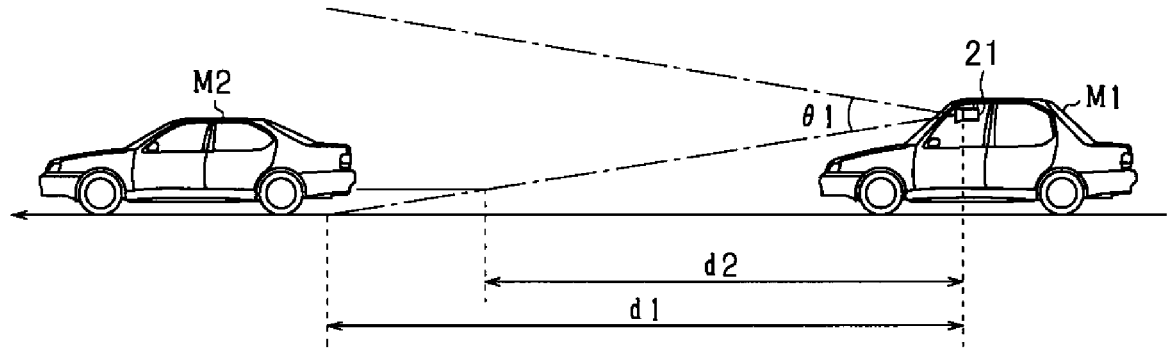
FIG. 2 is an explanatory diagram of a relationship between a distance between vehicles and an image lost state.

FIG. 2 is an explanatory diagram of a relationship between a distance between the own vehicle and the object and a state where the image target GT is lost. In FIG. 2, □1 represents a photographic angle of view of the image sensor 21. First, when d1 is a distance between the own vehicle M1 and the object (preceding vehicle M2), a whole rear end portion of the preceding vehicle M2 is included in the photographic angle of view □1 of the image sensor 21. Thus, a type of the image target GT is identified with use of the whole-body dictionary and a fusion target can be generated. However, when the distance between the own vehicle and the preceding vehicle M2 becomes closer to d2 (<d1), a lower end side of the rear end portion of the preceding vehicle M2 goes out of the photographic angle of view □1 of the image sensor 21. Thus, it becomes impossible to identify the type of the image target GT with use of the whole-body dictionary and the fusion target cannot be generated.

However, reliability of presence of the object which has been once recognized as the fusion target is high, and it is thus desirable that execution of vehicle control with respect to the object is possible even after the object becomes unrecognized as the fusion target.

Thus, when the image target GT is lost in a state where the object has been recognized with use of the fusion target, that is, when the state has transitioned to a state where the object is recognized with use of only the radar target LT, the vehicle control is performed with respect to the object recognized with use of only the radar target LT, on condition that the distance between the own vehicle and the object is a predetermined short distance.

That is, in a case where the image target GT is lost and the distance between the own vehicle and the object is the predetermined short distance, the control target 30 is activated when the TTC with the object recognized with use of only the radar target LT becomes the activation timing of the control target 30. Meanwhile, in a case where the distance between the own vehicle and the object is not the predetermined short distance, the control target 30 is not activated even when the TTC with the object recognized with use of only the radar target LT becomes the activation timing of the control target 30.

The predetermined short distance indicates a distance at which the lower end of the object disappears from sight. The predetermined short distance can be set for each vehicle model or the like by taking into account a mounting height, mounting angle, and the like of the image sensor 21. Thus, even when the image target GT is lost, it is possible to perform the vehicle control with respect to the object which has been detected as the fusion target and has high reliability.

When the relative speed between the object and the own vehicle is high, the TTC has a small value, and it is thus highly likely that activation of the control target 30 by the vehicle control has already been started before the image target GT is lost. In other words, a situation where the activation of the control target 30 by the vehicle control is not started at a time point when the image target GT is lost is limited to a situation where the relative speed between the object and the own vehicle is low and the TTC has a large value.

Figure 3:
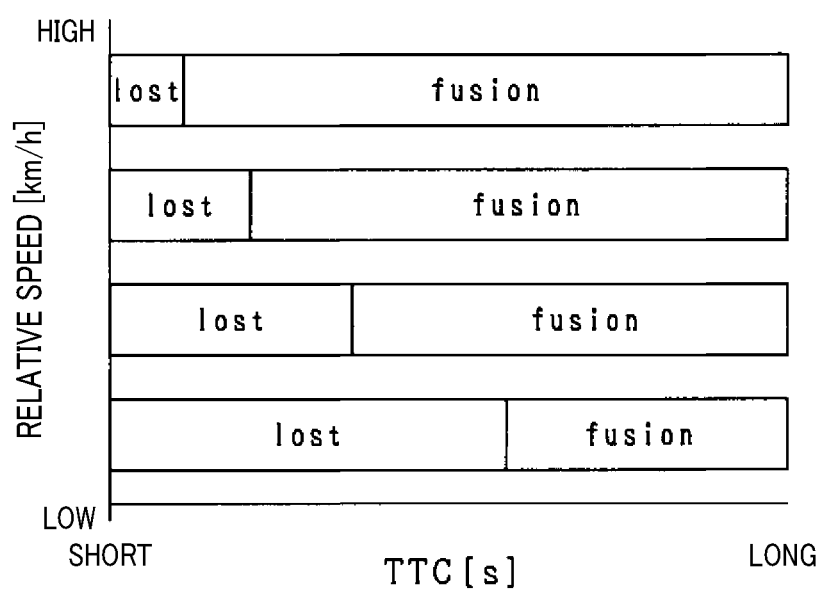
FIG. 3 is a view showing a relationship between a relative speed and time to collision.

With reference to FIG. 3, the following description will discuss in detail a relationship between the relative speed and the TTC. In FIG. 3, a longitudinal axis represents the relative speed and a lateral axis represents the TTC. As shown in FIG. 3, as the relative speed becomes higher, for the TTC having a smaller value, the object is detectable as the fusion target. Accordingly, it becomes more likely that, before the image target GT is lost, the control target 30 is activated by the vehicle control with respect to the object detected as the fusion target. Meanwhile, when the relative speed becomes lower, only for the TTC having a larger value, the object is detectable as the fusion target. Accordingly, it becomes more likely that the image target GT is lost before the control target 30 is activated by the vehicle control.

Thus, according to the present embodiment, the vehicle control is performed with respect to the object for which the state where the object has been recognized with use of the fusion target has switched to the state where the object is recognized with use of only the radar target LT, on condition that the relative speed between the object and the own vehicle is less than a predetermined value, in addition to the condition that the distance between the object and the own vehicle is the predetermined short distance.

After a predetermined time period has elapsed from when it became impossible to identify the object with use of the fusion target (from when the image target GT has been lost), reliability of the object identified with use of only the radar target is gradually reduced. As described above, when the image target GT is lost, the vehicle control is performed on condition that the distance between the own vehicle and the object is the short distance and the relative speed is low. Accordingly, it is highly likely that the vehicle has already been stopped before the predetermined time period has elapsed from when the fusion target has been lost. Thus, the vehicle control is performed when a time period of not more than the predetermined time period has elapsed from when the identification of the object with use of the fusion target became impossible. The vehicle control is not performed when a time period of more than the predetermined time period has elapsed from when the identification of the object with use of the fusion target became impossible.

Furthermore, according to the present embodiment, when the image target GT is lost and the state has transitioned to the state where the object is recognized with use of only the radar target LT, the determination on a collision is made by using the lateral position of the object obtained with use of the radar target LT instead of using the lateral position of the object obtained with use of the fusion target.

At this time, it is determined whether a difference between the lateral position of the object identified with use of the fusion target immediately before the image target GT is lost and the lateral position of the object identified with use of the radar target LT immediately after the detection has switched to the detection with use of only the radar target LT is less than a predetermined value. When there is a great difference between the lateral position of the object identified with use of the radar target LT and the lateral position of the object identified with use of the fusion target, the vehicle control is not performed. That is, when there is a great difference between the lateral position of the object identified with use of the radar target LT and the lateral position of the object identified with use of the fusion target, reliability of the object identified with use of the fusion target is reduced, and thus, in such a case, the vehicle control with use of the radar target is not performed.

When the lateral position of the object is in the predetermined approaching state with respect to the own vehicle, a probability of a collision between the object and the own vehicle is high. Meanwhile, when the lateral position of the object is not in the predetermined approaching state with respect to the own vehicle, the probability of a collision between the object and the own vehicle is low. Thus, according to the present embodiment, the vehicle control is performed on condition that the lateral position of the object is in the predetermined approaching state with respect to the own vehicle.

Thus, even when the image target GT is lost, it is possible to appropriately perform the vehicle control with respect to the object which has been detected as the fusion target and has high reliability.

With reference to a flow chart in FIG. 4, the following description will discuss an example in which the above process is performed by the ECU 10. When the radar target LT has been acquired, the ECU 10 repeatedly performs the process below for each radar target LT in a predetermined period.

First, the ECU 10 determines in step S11 whether the radar target LT is in a fusion state. For example, the ECU 10 makes an affirmative determination when the image target GT is included in a predetermined range in a coordinate system of the radar target LT and thus the radar target LT and the image target GT are in the fusion state.

When the radar target LT is in the fusion state, the ECU 10 determines in step S12 whether the lateral position of the object identified with use of the fusion target is not more than a predetermined first threshold Th1. More specifically, the ECU 10 determines whether, when an axis (own vehicle line O) indicates a center position of the own vehicle M1 in the vehicle width direction, a distance between the own vehicle line O and the lateral position is not more than the predetermined first threshold Th1.

When the ECU 10 has made an affirmative determination in the step S12, the ECU 10 determines in step S13 whether the TTC is not more than an activation timing Th2 of the control target 30. When the ECU 10 has made an affirmative determination in the step S13, the ECU 10 activates the control target 30 in step S14. When the ECU 10 has made a negative determination in the step S12 or S13, control proceeds to step S22 and the ECU 10 does not activate the control target 30.

Meanwhile, when the ECU 10 has made a negative determination in the step S11, the ECU 10 determines in step S15 whether the fusion state has transitioned to the state where the image target GT is lost (image lost FSN state). When the ECU 10 has made an affirmative determination in the step S15, the ECU 10 determines in step S16 whether a distance to the object identified with use of the radar target is not more than a third threshold Th3. When the ECU 10 has made an affirmative determination in the step S16, the ECU 10 determines in step S17 whether a relative speed between the own vehicle and the object identified with use of the radar target is not more than a fourth threshold Th4.

When the ECU 10 has made an affirmative determination in the step S17, the ECU 10 determines in step S18 whether the state where the image target GT is lost has continued for the predetermined number of times (or cycles) or less. In the process in the step S18, the ECU 10 makes an affirmative determination when, after the detection with use of the fusion target has switched to the detection with use of the radar target LT, the state where the object is detected with use of only the radar target LT has continued for the predetermined number of times or less. By using, as a determination condition, the determination of whether the state where the image target GT is lost has continued, the current state is distinguishable from a case where the image target GT is lost as a consequence of disturbance or the like.

When the ECU 10 has made an affirmative determination in the step S18, the ECU 10 determines in step S19 whether the lateral position of the object identified with use of the radar target LT is not more than a fifth threshold Th5. The fifth threshold Th5 has been set as a value for determining the approaching state between the vehicle and the object. When the ECU 10 has made an affirmative determination in the step S19, the ECU 10 determines in step S20 whether the lateral position of the object identified with use of the fusion target immediately before the image target GT is lost is not more than a sixth threshold Th6. A difference between the fifth threshold Th5 and the sixth threshold Th6 has been set to be less than a predetermined value. Accordingly, when the ECU 10 has made an affirmative determination in both of the steps S19 and S20, a difference between the lateral position of the object identified with use of the radar target LT and the lateral position of the object identified with use of the fusion target is less than a predetermined value. When the ECU 10 has made an affirmative determination in the step S20, the ECU 10 determines in step S21 whether the TTC is not more than the activation timing Th2 of the control target 30. When the ECU 10 has made an affirmative determination in the step S21, control proceeds to the step S14 and the ECU 10 activates the control target 30. When the ECU 10 has made a negative determination in any of the steps S15 to S21, control proceeds to the step S22 and the ECU 10 does not activate the control target 30.

Figure 1B:
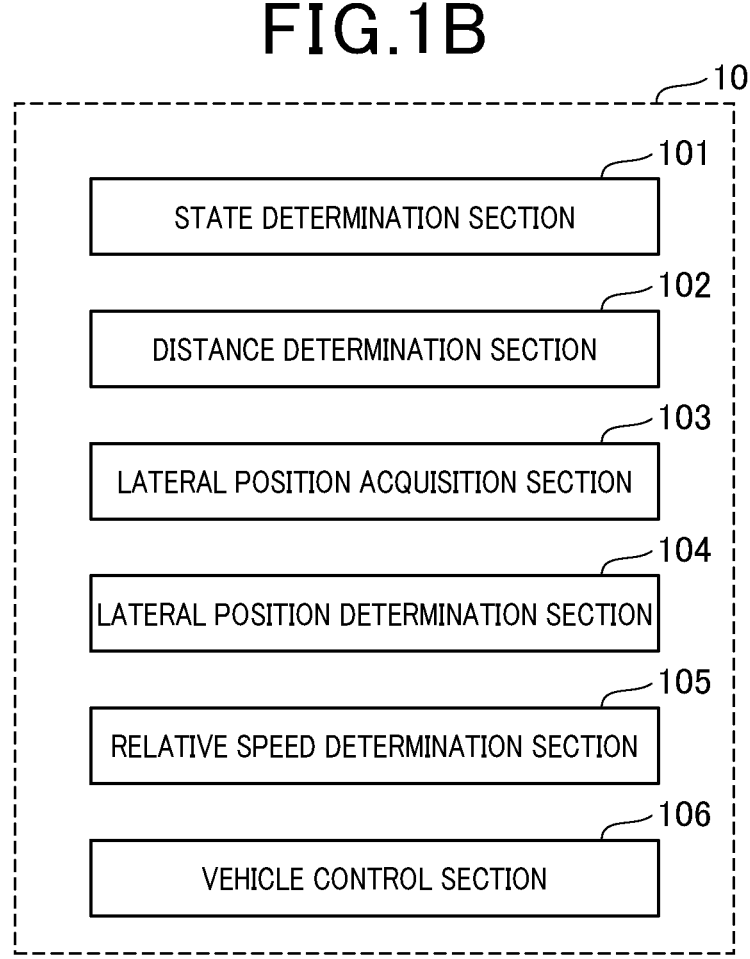
FIG. 1B is a functional block diagram of an ECU of the first embodiment.

FIG. 1B shows functional blocks showing functions of the ECU 10. The ECU 10 includes a state determination section 101, a distance determination section 102, a lateral position acquisition section 103, a lateral position determination section 104, a relative speed determination section 105, and a vehicle control section 106.

The state determination section 101 is a functional block which performs the step S15 in the flow chart in FIG. 4. The state determination section 101 determines whether the state where the object is detected with use of the fusion target has transitioned to the state where the object is detected with use of only the first target information.

The distance determination section 102 is a functional block which performs the step S16. The distance determination section 102 determines whether the distance to the object is the predetermined short distance when the state determination section 101 determines that the state has transitioned to the state where the object is detected with use of only the first target information.

The lateral position acquisition section 103 is a functional block which acquires the lateral position of the object in the vehicle width direction. After it is determined that the state where the object has been detected as the fusion target has transitioned to the state where the object is detected with use of only the first target information, the lateral position acquisition section 103 acquires the lateral position of the object in the vehicle width direction with use of the first target information. In a case where the state where the object has been detected as the fusion target transitions to the state where the object is detected with use of only the first target information, the lateral position acquisition section 103 acquires a first lateral position of the object with use of the fusion target generated immediately before the transition and acquires a second lateral position of the object with use of the first target information acquired immediately after the transition.

The lateral position determination section 104 is a functional block which performs the steps S19 and S20. The lateral position determination section 104 determines whether the lateral position of the object in the vehicle width direction acquired by the lateral position acquisition section is in the predetermined approaching state with respect to the own vehicle (i.e., whether the lateral position of the object identified with use of the radar target LT is not more than the fifth threshold Th5) at a time point when the distance determination section 102 determines that the distance to the object is the predetermined short distance. When the lateral position of the object in the vehicle width direction is in the predetermined approaching state with respect to the own vehicle, the lateral position determination section 104 determines whether a difference between the first lateral position and the second lateral position is not less than a predetermined value.

The relative speed determination section 105 is a functional block which performs the step S17. The relative speed determination section 105 determines whether the relative speed between the object and the own vehicle is less than a predetermined value (Th4).

The vehicle control section 106 is a functional block which performs the steps S14 and S22. The vehicle control section 106 performs the vehicle control with respect to the object in accordance with the flow chart in FIG. 4.

The above configuration can yield effects below.

(1) Accuracy for detecting an object is improved by detecting the object with use of the fusion target generated by fusion of the radar target LT and the image target GT. When the own vehicle and the object approach each other, however, a part (e.g., lower end) of the object goes out of the acquired image and the image target GT is not acquired. In such a case, the fusion target is not generated and this may prevent execution of the vehicle control with use of the fusion target with respect to the object.

Meanwhile, an object (object) detected as the fusion target before the own vehicle and the object approach each other has high reliability, and it is thus desirable to perform the vehicle control with respect to the object even when the fusion target becomes undetected due to the approach between the own vehicle and the object.

Thus, when it becomes impossible to acquire the image target GT and the state where the object has been detected with use of the fusion target has accordingly transitioned to the state where the object is detected with use of only the radar target LT, the vehicle control with respect to the object is performed on condition that the distance to the object is the predetermined short distance. This makes it possible to perform the vehicle control with respect to the object having high reliability, even after the object becomes undetected as the fusion target.

(2) In a case where it is determined that the state where the object has been detected as the fusion target has transitioned to the state where the object is detected with use of only the radar target LT and that the distance between the own vehicle and the object is the predetermined short distance, the probability of a collision between the object and the own vehicle is high when the lateral position of the object at the time is in the predetermined approaching state with respect to the own vehicle, and the probability of a collision between the object and the own vehicle is low when the lateral position of the object is not in the predetermined approaching state with respect to the own vehicle.

Thus, when it is determined that the state has transitioned to the state where the object is detected with use of only the radar target LT and that the distance between the own vehicle and the object is the predetermined short distance, the vehicle control with respect to the object is performed on condition that the lateral position of the object is in the predetermined approaching state with respect to the own vehicle. In this case, the vehicle control is not performed when the probability of a collision between the object and the own vehicle is low. This makes it possible to perform the vehicle control with respect to the object having high reliability, while suppressing unnecessary vehicle control after the object becomes undetected as the fusion target.

(3) After the state where the object is detected as the fusion target has transitioned to the state where the object is detected with use of only the radar target LT, the lateral position of the object in the vehicle width direction is obtained with use of the radar target LT. This makes it possible to acquire the lateral position of the object at the time with high accuracy.

(4) In a case where there is a great difference between the lateral position of the object acquired as the fusion target and the lateral position of the object acquired as the radar target LT when the state where the object has been detected as the fusion target has transitioned to the state where the object is detected with use of only the radar target LT, it is highly likely that the object has moved. In such a case, therefore, by not performing the vehicle control of the own vehicle, it is possible to suppress unnecessary vehicle control.

(5) When the relative speed between the object and the own vehicle becomes higher, the time to collision (TTC) which is calculated by dividing the distance by the relative speed becomes shorter, and it thus becomes more likely that the vehicle control is started before the fusion target becomes undetected. In other words, a situation where the image target GT becomes undetectable before the vehicle control is started is limited to a situation where the relative speed between the object and the own vehicle is low and the time to collision (TTC) is long. Thus, the vehicle control of the own vehicle is performed on condition that the relative speed is low when it is determined that the object is located at the predetermined short distance. This makes it possible to suppress unnecessary vehicle control and perform the vehicle control with respect to the object having high reliability, after the detection of the object with use of the fusion target becomes impossible.

(6) After the predetermined time period has elapsed from when the state has transitioned to the state where the object is detected with use of only the radar target LT, reliability of the object is reduced. In this case, therefore, the vehicle control with respect to the object is not performed regardless of whether the distance to the object is the predetermined short distance. This makes it possible to avoid unnecessary vehicle control with respect to the object having reduced reliability.

(7) The vehicle control is not performed when the object becomes undetected as the fusion target due to a reason other than a fact that the distance to the object is the short distance.

This makes it possible to avoid unnecessary vehicle control in a situation where reliability of detecting the object may have been reduced.

(Second Embodiment)

The following description will discuss a second embodiment with emphasis on differences from the first embodiment. According to the first embodiment, in a case where the distance to the object is the short distance at the time point when the image target GT is lost, the activation of the loudspeaker, the seat belt, the brake, or the like is performed as the vehicle control. According to the second embodiment, in such a case, the brake is activated so that a collision with the object is avoided.

Figure 5A:
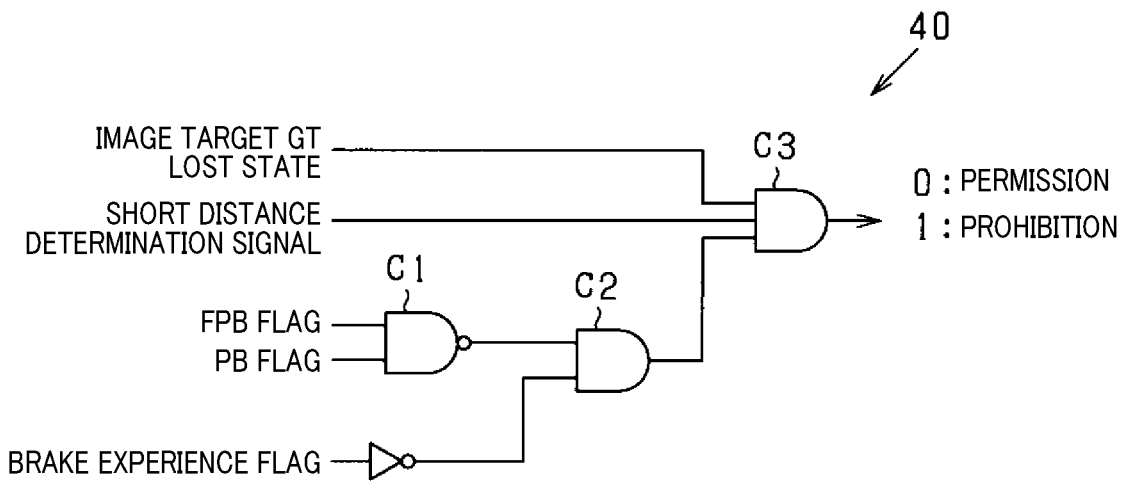
FIG. 5A is a structure diagram of a logic circuit for determining permission and prohibition of PB.
Figure 5B:
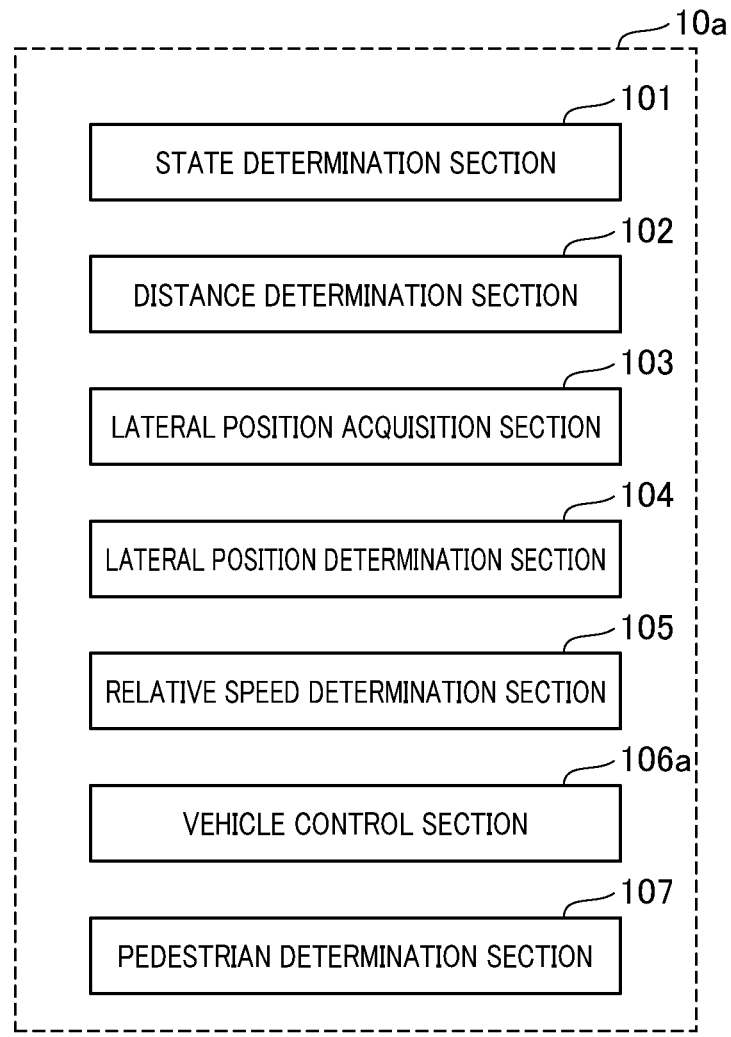
FIG. 5B is a functional block diagram of the ECU of the second embodiment.

As shown in FIG. 5B, an ECU 10a (see also FIG. 1A) of the second embodiment further includes a pedestrian determination section 107 which determines whether the object is a pedestrian, and the ECU 10a includes the state determination section 101, the distance determination section 102, the lateral position acquisition section 103, the lateral position determination section 104, and the relative speed determination section 105 as with the first embodiment. In addition to the function of the vehicle control section 106 of the first embodiment, a vehicle control section 106a (described later in detail) of the present embodiment performs first brake control on the basis of a first margin which is a margin to collision with the object and performs second brake control on the basis of a second margin which is a margin to collision smaller than the first margin.

As the brake control which is for avoiding a collision and is performed by the vehicle control section 106a, brake control in two stages, that is, preliminary braking (FPB) and intervention braking (PB) have been proposed. Specifically, when the probability of a collision with the object arises, weaker braking is first performed as the FPB. The activation of the FPB allows earlier start of application of a braking force of the PB and issuance of a warning to the driver. If the driver does not perform an operation for avoiding a collision even after the activation of the FPB, stronger braking is performed as the PB. That is, as compared with the FPB, the PB is performed in a situation where the probability of a collision is high, and the braking force of the PB is usually set to be greater than that of the FPB. Since the PB is thus activated in more limited situations, an activation condition for the PB is set to be stricter than an activation condition for the FPB, that is, the activation condition for the PB is set to be less likely to be satisfied.

According to the present embodiment, the activation condition for the FPB is set so that the FPB is activated when the lateral position of the object identified with use of the fusion target is not more than the predetermined first threshold Th1 and the TTC becomes not more than an activation timing Th7 of the FPB. When the condition is satisfied, a FPB flag is set to "1." Note, however, that the FPB is set so that the FPB is not activated when the TTC is not more than an activation timing Th8 of the PB. That is, in such a situation, the activation of the PB is given a higher priority.

Meanwhile, the activation condition for the PB is set so that the PB is activated when the lateral position of the object is not more than the predetermined fifth threshold Th5 and the TTC becomes not more than the activation timing Th8 of the PB. When the condition is satisfied, a PB flag is set to "1."

The threshold of the TTC is set so that a value of the activation timing Th7 of the FPB is larger than that of the activation timing Th8 of the PB. That is, the threshold of the TTC is set so that the FPB is performed in a situation where the margin to collision is high, in other words, in a situation where the probability of a collision is low. After the FPB is activated, the activation of the FPB is stopped by an operation (e.g., turning of a steering wheel or brake operation) performed by the driver, that is, the FPB can be cancelled. After the PB is activated, however, the activation of the PB is not cancelled by the operation performed by the driver.

According to the present embodiment, the FPB corresponds to the "first brake control" and the PB corresponds to the "second brake control." Furthermore, the activation timing Th7 corresponds to the "first margin" and the activation timing Th8 corresponds to the "second margin."

In a case where the FPB has already been activated at a time point when the image lost FSN state occurs and the activation condition for the PB is satisfied, as an item with which contact is to be avoided, the object has been detected before the activation of the PB. That is, even though the object has continuously been detected, reliability of the detected object is considered to be high. Meanwhile, in a case where the FPB has not been activated at the time point when the image lost FSN state occurs and the activation condition for the PB is satisfied, as the item with which contact is to be avoided, no object has been detected before the activation of the PB. That is, no object has been detected in advance, and thus reliability of a detected object is considered to be low. Such a situation occurs, for example, due to erroneous detection of an object by the radar sensor 22, detection of an object by sudden entry of the object from a side, or the like. The activation of the PB based on these factors may be unnecessary activation.

Thus, according to the present embodiment, the PB is activated on condition that the FPB has been activated at a time point when it is determined that the image lost FSN state has occurred at a short distance. That is, at a time point when the PB is activated, in a case where the FPB has been activated in advance, it is determined that the possibility of a collision exists, and the PB is thus activated. In a case where the FPB has not been activated in advance, it is determined that the probability of a collision is low, and the PB is thus not activated. That is, in a case where the FPB has been activated, the activation of the PB is permitted, and in a case where the FPB has not been activated, the activation of the PB is prohibited.

Meanwhile, in some cases, when the FPB has been activated, a temporal change in behavior of the object (e.g., the lateral position of the object temporarily exceeds a threshold) causes the activation condition for the FPB to become unsatisfied and thus the FPB is ended. In this case, the activation condition for the PB may be satisfied when the lateral position of the object later becomes again not more than the threshold. In such a case, reliability of the detected object is considered to be high within a predetermined time T after the end of the FPB.

Thus, according to the present embodiment, a predetermined time period is allowed after the activation of the FPB is ended, and execution of the PB is permitted. Specifically, even in a case where the FPB is not performed at the time point when it is determined that the image lost FSN state has occurred at the short distance, the PB is performed on condition that there is a history of the FPB having been ended within the last predetermined time T. According to the present embodiment, a brake experience flag is used as the history. The brake experience flag is set to "1" at a time point when the activation of the FPB is ended. The brake experience flag is reset to "0" after the predetermined time T has elapsed.

FIG. 5A shows a logic circuit 40 for determining permission and prohibition of the activation of the PB in accordance with the present embodiment. The logic circuit 40 includes a NAND circuit C1 into which signals of the FPB flag and the PB flag are inputted, an AND circuit C2 into which an output signal of the NAND circuit C1 and an inverted signal of the brake experience flag are inputted, and an AND circuit C3 into which an output signal of the AND circuit C2, a control signal for the image lost FSN state, and a short distance determination signal are inputted. The activation of the PB is prohibited when a signal outputted from the AND circuit C3 is "1." The activation of the PB is permitted when the signal outputted from the AND circuit C3 is "0."

According to the logic circuit 40, the NAND circuit C1 outputs "0" when both of the FPB flag and the PB flag are "1" and outputs "1" when at least one of the FPB flag and the PB flag is "0." The AND circuit C2 outputs "1" only when the output signal of the NAND circuit C1 is "1" and the brake experience flag is "0."

As described above, as the control signal for the image lost FSN state, "1" is inputted when the fusion state has transitioned to the state where the image target GT is lost (image lost FSN state), and "0" is inputted when the state is not the image lost FSN state. As also described above, as the short distance determination signal, "1" is inputted when the distance to the object identified with use of the radar target LT is not more than the third threshold Th3, and "0" is inputted when the distance is more than the third threshold Th3.

The AND circuit C3 outputs "1" only when the output signal of the AND circuit C2 is "1," the state is the image lost FSN state, and the distance to the object is the short distance. That is, the activation of the PB is prohibited in a case where the FPB has not been activated and there has been no brake experience at the time point when the image lost state occurs at the short distance.

Figure 6:
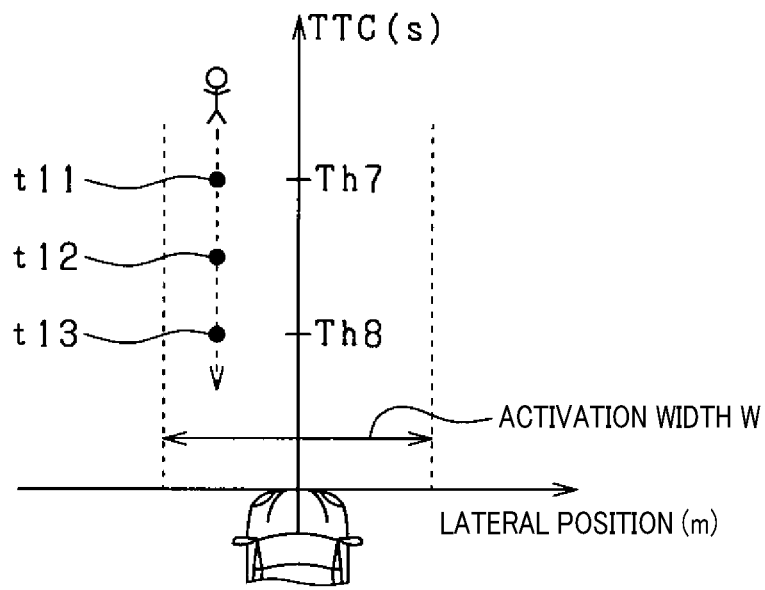
FIG. 6 is a plan view showing a case where the own vehicle approaches an object.
Figure 8:
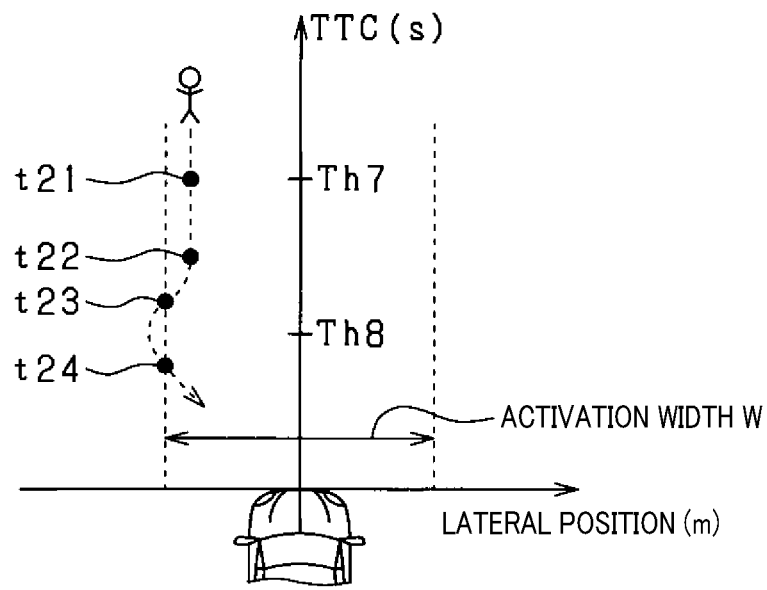
FIG. 8 is a plan view showing a case where the own vehicle approaches the object.
Figure 10:
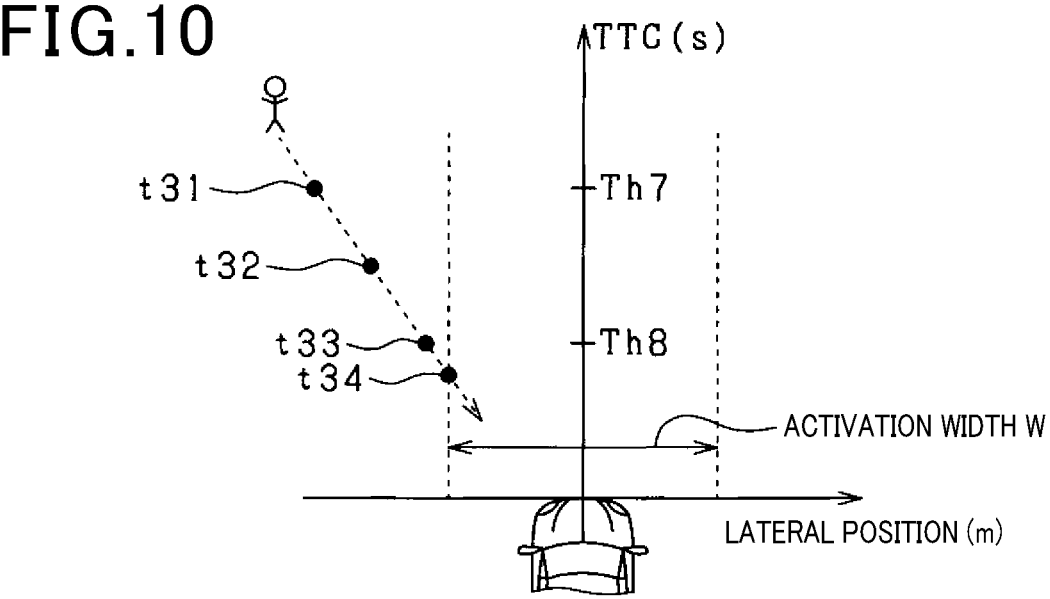
FIG. 10 is a plan view showing a case where the own vehicle approaches the object.

Next, with reference to FIGS. 6 to 11, the following description will discuss a case where the activation of the PB is permitted and a case where the activation of the PB is prohibited. The following describes a state of the activation of the PB in the following cases:

(1) A case where, after the FPB is activated, the PB is activated in a state where the FPB has been activated;
(2) A case where the FPB is activated and then the FPB is once ended, and the PB is subsequently activated;
(3) A case where the activation of the PB is prohibited due to sudden entry of the pedestrian or the like from the side. FIGS. 6, 8, and 10 are each a plan view in which a longitudinal axis represents the TTC (time to collision) and a lateral axis represents the lateral position with respect to the own vehicle in the vehicle width direction of the own vehicle. On the longitudinal axis, the activation timing Th7 of the FPB and the activation timing Th8 of the PB are provided. In this case, a time point when the TTC with the object becomes less than the threshold of each of the PB and FPB is determined as the activation timing of the corresponding one of the PB and FPB.

Figure 7:
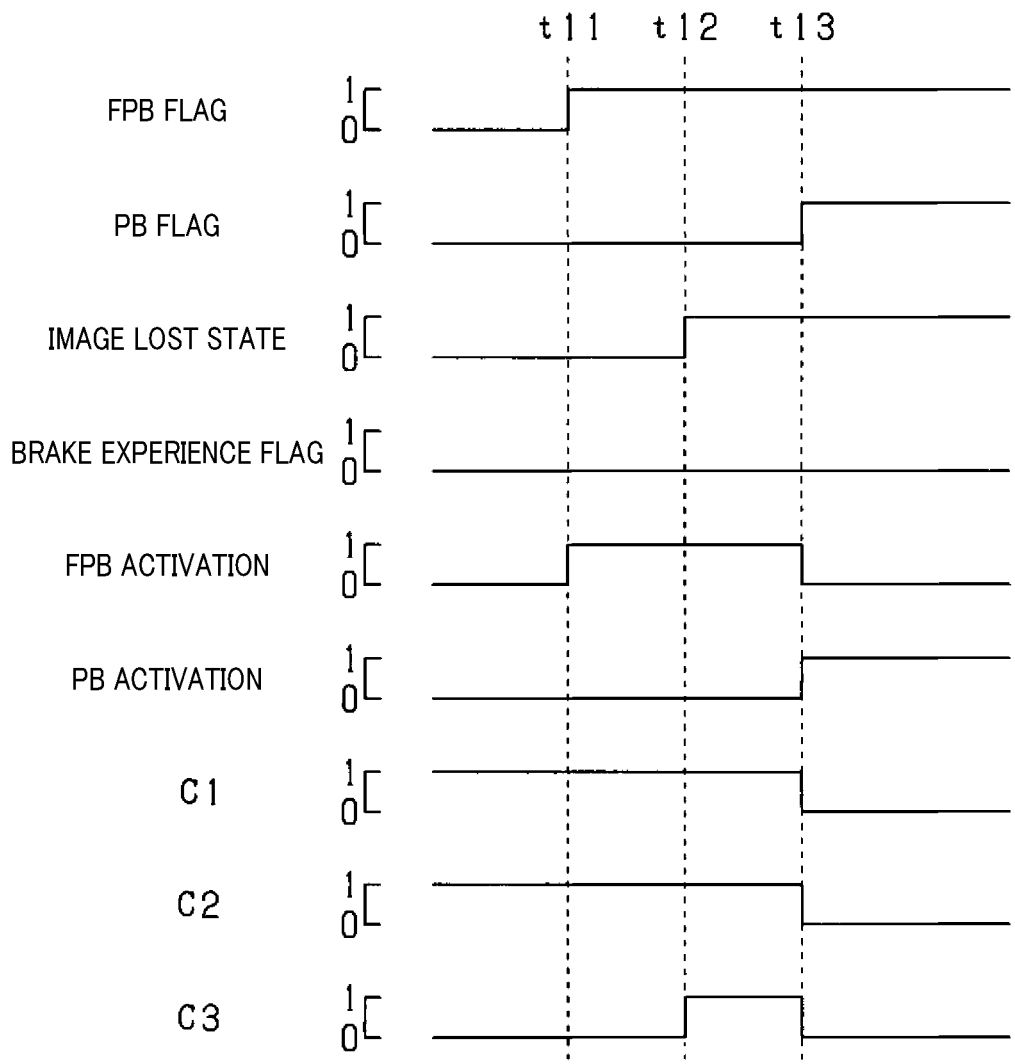
FIG. 7 is a timing chart showing a mode in which activation of the PB is permitted.
Figure 9:
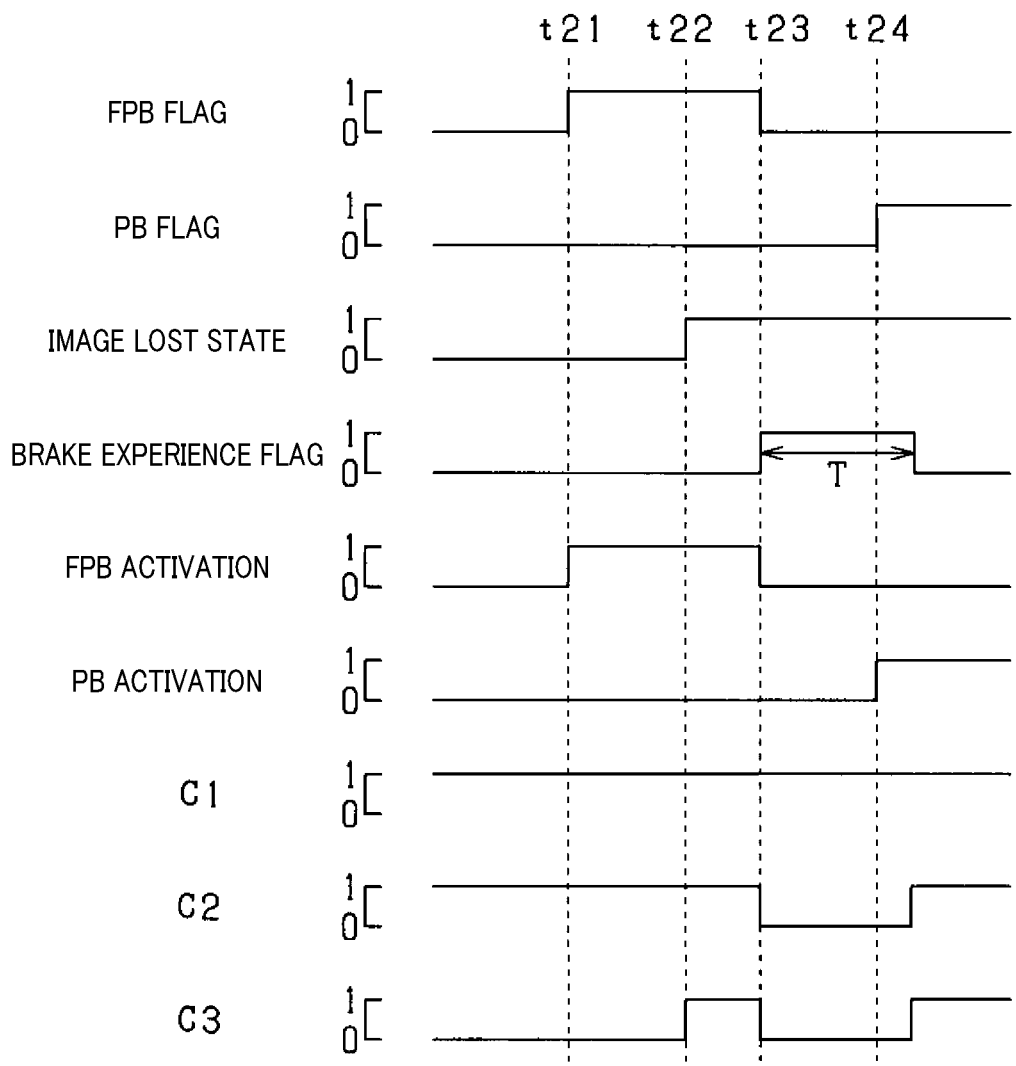
FIG. 9 is a timing chart showing a mode in which activation of the PB is permitted.
Figure 11:
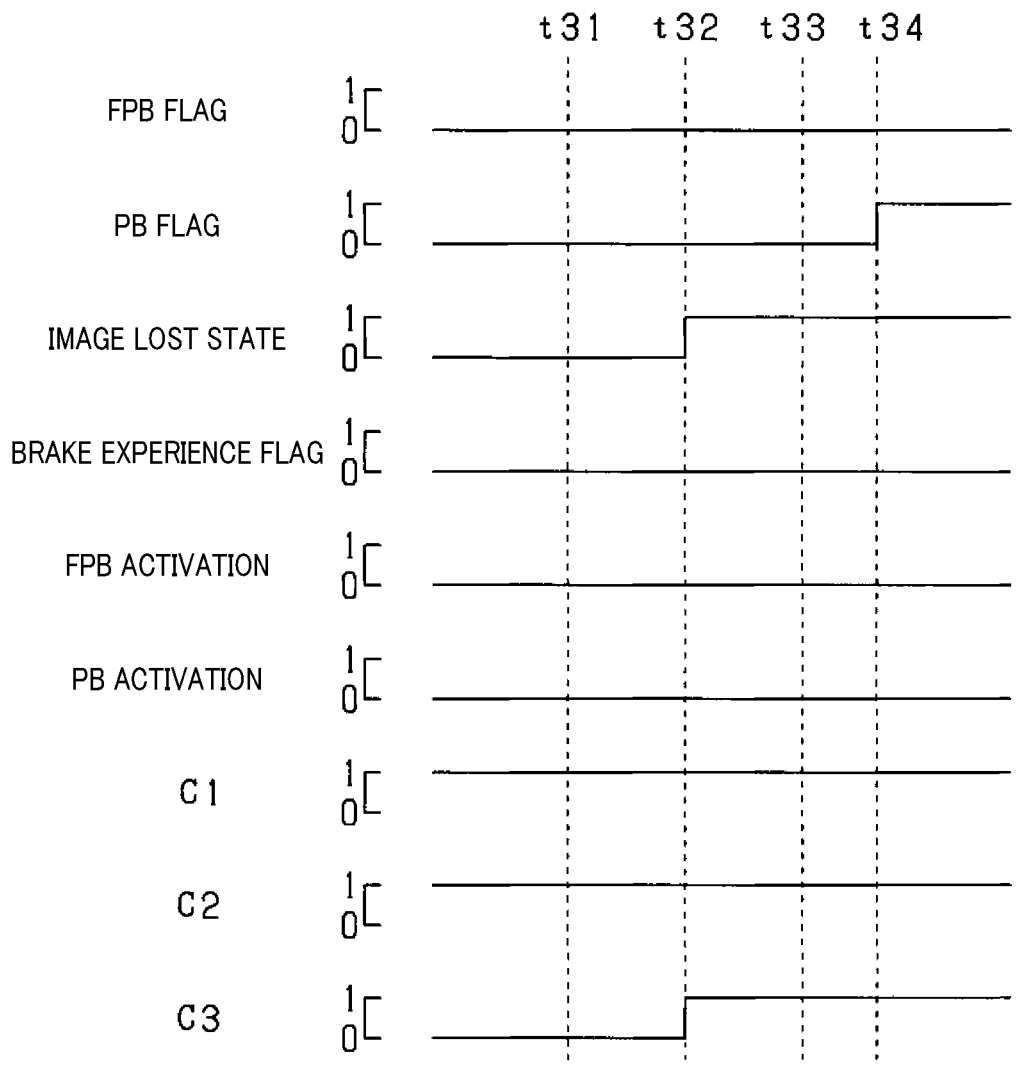
FIG. 11 is a timing chart showing a mode in which activation of the PB is prohibited.

With regard to the lateral axis, an activation width W which is an activation area for the FB and the PB in the vehicle width direction is provided. The activation width W has been set by adding a predetermined length to each of left and right sides of the own vehicle in the vehicle width direction. In FIGS. 6, 8, and 10, a predetermined lateral position (Th1, Th5) is satisfied when a pedestrian as the object is located in the activation width W. FIGS. 6, 8, and 10 assume a case where the pedestrian approaches the own vehicle along a dashed arrow while the own vehicle travels in its direction of travel. FIGS. 7, 9, and 11 are timing charts corresponding to respective FIGS. 6, 8, and 10.

FIGS. 6 and 7 show the case where after the FPB is activated, the PB is activated in a state where the FPB has been activated. When the TTC becomes not more than the activation timing Th7 at a timing t11 in a state where the pedestrian has been detected in the activation width W, the FPB flag is set to "1" and the FPB is activated. Then, the pedestrian and the own vehicle further approach each other, and the state transitions to the image lost FSN state ("0"=>"1") at a timing t12. At this time, the determination signal for short distance is "1" and the output signal of the AND circuit C3 is "1" (the same applies to a timing t22 in FIG. 9 and a timing t32 in FIG. 11). When the TTC becomes not more than the activation timing Th8 at a timing t13, the PB flag is set to "1," and the FPB is ended and the PB is activated.

At the timing t13, the PB flag is set to "1" while the FPB flag is "1," and this causes the output signal of the NAND circuit C1 to be "0." Accordingly, the output signal of each of the AND circuit C2 and the AND circuit C3 becomes "0," and thus the activation of the PB is permitted. That is, the PB is performed on condition that the FPB has been performed, in other words, the FPB flag is "1" at a time point when it is determined that the state is the image lost FSN state and that the distance to the object is the short distance.

FIGS. 8 and 9 show the case where the FPB is activated and then the FPB is once ended, and the PB is subsequently activated. As with FIGS. 6 and 7, the FPB is activated at a timing t21 and the state transitions to the image lost FSN state ("0"=>"1") at the timing t22. Then, when the pedestrian goes out of the activation width W at a timing t23, the FPB flag is reset to "0" and the FPB is ended. At this time, the brake experience flag is set to "1." At a timing t24, the object is detected again in the activation width W. At this time, an interval between the timing t23 and the timing t24 is within the predetermined time T (e.g., 0.7 msec), and thus the brake experience flag is maintained to be "1" and this causes the PB to be activated.

In this case, according to the logic circuit 40, the brake experience flag has already been "1" at a time point when the PB flag is set to "1," and the output signal of each of the AND circuit C2 and the AND circuit C3 becomes "0" accordingly, and thus the activation of the PB is permitted. That is, the PB is performed on condition that there is a history of the FPB having been ended within the last predetermined time T, in other words, the brake experience flag is "1" at a time point when it is determined that the state is the image lost FSN state and that the distance to the object is the short distance.

FIGS. 10 and 11 show the case where the activation of the PB is prohibited due to sudden entry of the pedestrian from the side. In this case, at a timing t31, the TTC becomes not more than the activation timing Th7 but the pedestrian has not been detected in the activation width W, and thus the FPB flag is maintained to be "0." At the subsequent timing t32, the state transitions to the image lost FSN state ("0"=>"1"). At a timing t33, the TTC becomes not more than the activation timing Th8 but the pedestrian has still not been detected in the activation width W, and thus the PB flag is maintained to be "0." When the pedestrian is detected in the activation width W at a timing t34, the PB flag is set to "1." At this time point, however, the FPB has not been activated (the FPB flag is not "1") and the brake experience flag has not been set to "1," and thus the activation of the PB is prohibited. That is, the FPB is not performed in a case where the FPB has not been performed and there is no history of the FPB having been ended within the last predetermined time T at a time point when it is determined that the state is the image lost FSN state and that the distance to the object is the short distance.

Figure 12:
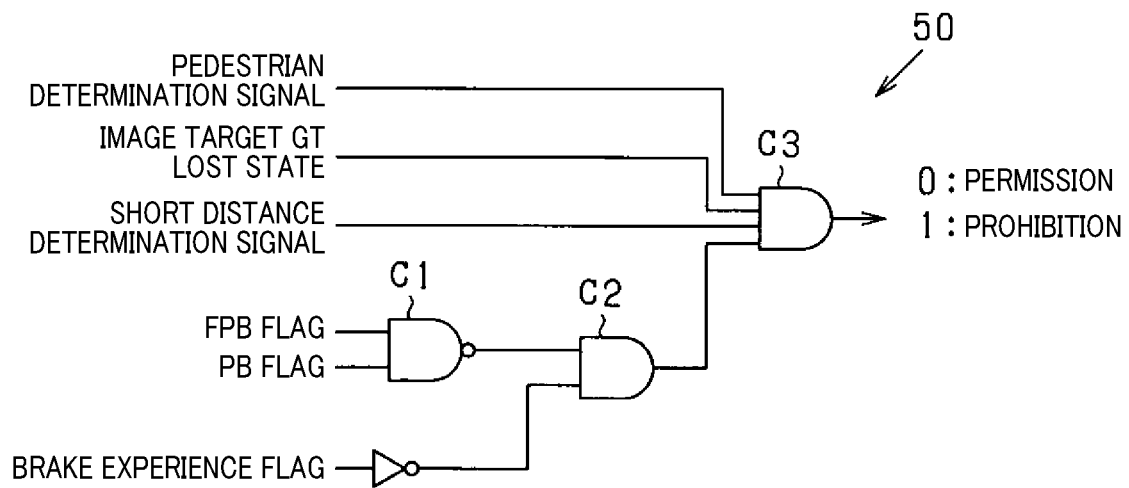
FIG. 12 is a structure diagram of a logic circuit for determining permission and prohibition of the PB in another example.

In a case where the object suddenly enters from the side as shown in FIGS. 10 and 11, the object can be, for example, a pedestrian. Even if the pedestrian is coming toward the own vehicle from a position near and ahead of the own vehicle, it is considered that the pedestrian can easily stop or change direction. If the PB is performed in such a case, therefore, the activation of the PB is highly likely to be unnecessary activation. For example, FIG. 12 shows a logic circuit 50 in which an input of a determination signal for pedestrian is added to the logic circuit 40. In this case, the determination signal for pedestrian is inputted into the AND circuit C3. As the determination signal for pedestrian, "1" is inputted when it is determined that the object is a pedestrian and "0" is inputted when it is determined that the object is not a pedestrian. That is, the activation of the PB is prohibited when the object is a pedestrian, and this makes it possible to suppress unnecessary activation of the PB.

Figure 13:
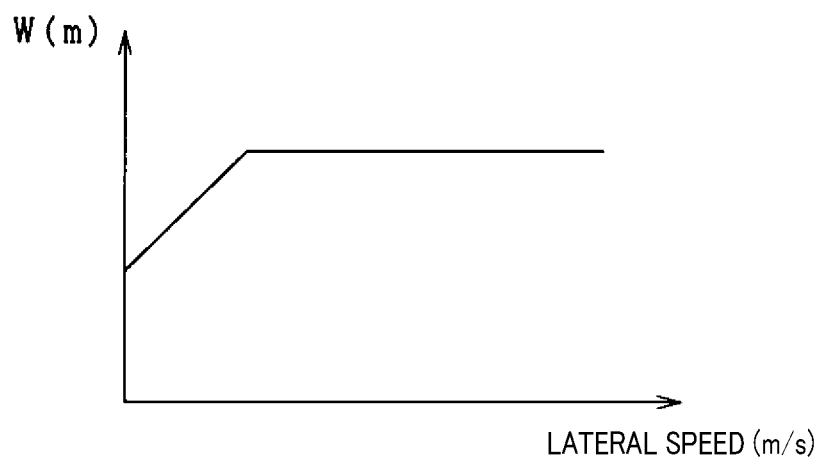
FIG. 13 is a view showing a relationship between an activation width W and a lateral speed of the object.

The activation width W can be variable depending on a type of the object, a lateral speed of the object, or the like. For example, the activation width W and the lateral speed of the object have a relationship as shown in FIG. 13. As shown in FIG. 13, until the lateral speed of the object exceeds a predetermined value, as the lateral speed increases, the activation width W also increases. Meanwhile, after the lateral speed of the object exceeds the predetermined value, the activation width W is constant and has an upper limit value.

In addition to the effects of the first embodiment, the aforementioned configuration of the present embodiment can yield an effect below.

In a case where the distance to the object is the short distance at the time point when the image target GT is lost, the PB is performed when the FPB has been performed in advance, and the PB is not performed when the FPB has not been performed in advance. In this case, reliability of the object is considered to be high when the FPB has been performed in advance, while reliability of the object is considered to be low when the FPB has not been performed in advance. This configuration makes it possible to suppress unnecessary PB and appropriately perform the brake control by the PB when the detection of the object with use of the fusion target becomes impossible.

(Other Embodiments)

The present invention is not limited to the above configurations and can be implemented as below. In the following description, components similar to the aforementioned components are given the same reference numerals in the drawings and detailed descriptions on such components are omitted.

(A1) When the relative speed between the object and the own vehicle is high, it is assumed that the image target GT is lost after the activation of the control target 30 by the vehicle control is started. In such a case, the ECU 10 can maintain the activation of the control target 30 by continuing the vehicle control even after the image target GT is lost.

By continuing the vehicle control of the own vehicle when it is determined that the state has transitioned to the state where the object is detected with use of only the radar target LT, in a situation where the object has been detected as the fusion target and the vehicle control has been performed, occurrence of a problem as below can be prevented. That is, it is possible to prevent, for example, a situation where execution of the vehicle control is suddenly stopped when the fusion target becomes undetectable and this cause the activation of the control target 30 to be suddenly stopped.

(A2) The ECU 10 can perform the vehicle control in a case where the object identified with use of the fusion target is in a predetermined approaching state with respect to the own vehicle at a time point when the image target GT is lost. For example, in a case where a distance between the own vehicle line 0 and the lateral position is within a predetermined value at the time point when the image target GT is lost, the ECU 10 can perform the vehicle control after the image target GT is lost.

(A3) In the flow chart in FIG. 4, when it is determined that the image target GT has been lost, it is only necessary to determine whether to perform the vehicle control at least on the basis of whether the distance to the object is less than the threshold, and the determination conditions in the steps S17 to S20 can be omitted.

(A4) An orientation of an imaging central axis of the image sensor 21 is variable depending on a change in loading weight of the own vehicle. This causes a change in position at the short distance at which the image target GT is lost. In the flow chart in FIG. 4, therefore, the third threshold Th3 of the distance used for the determination in the step S16 can be set to be variable depending on the change in orientation of the imaging central axis of the image sensor 21 in the own vehicle. The change in imaging central axis can be obtained on the basis of a value detected by a weight sensor provided in the vehicle. In this case, as the loading weight of the vehicle is greater, a rear portion of the vehicle is lowered with respect to a front portion of the vehicle and the imaging central axis is oriented upward, and thus the third threshold Th3 is set to be smaller. When the third threshold Th3 is thus set by taking into account the change in orientation of the imaging central axis of the image sensor 21, it is possible to determine, with higher accuracy, a distance between vehicles at which the image target GT is lost. Alternatively, the distance between vehicles at which the image target GT is lost can be obtained by taking into account that the mounting height of the image sensor 21 changes in accordance with the change in loading weight of the own vehicle.

(A5) According to the second embodiment, the TTC is used as the activation timing of each of the PB and the FPB. However, the activation timing of each of the PB and the FPB is not limited to this, provided that a parameter indicating the margin to collision is used. For example, a distance to the object based on the TTC can be used.

(A6) According to the second embodiment, the object with respect to which the vehicle control is performed is a pedestrian. However, the object is not limited to the pedestrian and can be another vehicle, a road obstacle, or the like.

The invention claimed is:

1. A vehicle control device which generates a fusion target by fusion of first target information on an object ahead of an own vehicle and second target information on the object and performs vehicle control of the own vehicle when time to collision with the object detected as the fusion target becomes an activation timing, the first target information being acquired as a reflected wave of a carrier wave, the second target information being acquired by image processing of an acquired image acquired by photographing a region of a predetermined range ahead of the own vehicle, the time to collision being time which elapses before the own vehicle collides with the object, the vehicle control device characterized by comprising:
a state determination section which determines whether a state where the object is detected with use of the fusion target has transitioned to a state where the object is detected with use of only the first target information;

a distance determination section which determines whether a distance to the object is a predetermined short distance at which a lower end of the object goes out of the predetermined range when the state determination section determines that the state has transitioned to the state where the object is detected with use of only the first target information; and a vehicle control section, the vehicle control section performing the vehicle control with respect to the object when the time to collision with the object detected with use of only the first target information becomes the activation timing in a case where the distance determination section determines that the distance to the object is the predetermined short distance, the vehicle control section not performing the vehicle control with respect to the object even when the time to collision with the object detected with use of only the first target information becomes the activation timing in a case where the distance determination section determines that the distance to the object is not the predetermined short distance.

2. The vehicle control device according to claim 1, further comprising:

a lateral position acquisition section which acquires a lateral position of the object in a vehicle width direction, in a case where the lateral position of the object in the vehicle width direction acquired by the lateral position acquisition section is a predetermined approaching state with respect to the own vehicle at a time point when it is determined that the distance to the object is the predetermined short distance, the vehicle control section performing the vehicle control with respect to the object.

3. The vehicle control device according to claim 2, wherein:

the lateral position acquisition section acquires the lateral position of the object in the vehicle width direction with use of the first target information after it is determined that the state where the object has been detected as the fusion target has transitioned to the state where the object is detected with use of only the first target information.

4. The vehicle control device according to claim 3, wherein:

in a case where the state where the object has been detected as the fusion target transitions to the state where the object is detected with use of only the first target information, the lateral position acquisition section acquires a first lateral position of the object with use of the fusion target generated immediately before the transition and acquires a second lateral position of the object with use of the first target information acquired immediately after the transition; and the vehicle control section does not perform the vehicle control with respect to the object when a difference between the first lateral position and the second lateral position is not less than a predetermined value.

5. The vehicle control device according to claim 1, further comprising:

a relative speed determination section which determines a relative speed between the object and the own vehicle, the vehicle control section performing the vehicle control with respect to the object on condition that the relative speed between the object and the own vehicle is less than a predetermined value when it is determined that the object is located at the predetermined short distance.

6. The vehicle control device according to claim 1, wherein:

the vehicle control section continues the vehicle control with respect to the object is continued when it is determined that the state has transitioned to the state where the object is detected with use of only the first target information in a situation where the object has been detected as the fusion target and the vehicle control with respect to the object has been performed.

7. The vehicle control device according to claim 1, wherein:

regardless of whether the distance to the object is the predetermined short distance, the vehicle control with respect to the object is not performed after a predetermined time period has elapsed from when the state where the object has been detected as the fusion target has transitioned to the state where the object is detected with use of only the first target information.

8. The vehicle control device according to claim 1, wherein:

the vehicle control section does not perform the vehicle control with respect to the object when it is determined that the distance to the object is not the predetermined short distance.

9. The vehicle control device according to claim 1, as the vehicle control, the vehicle control device performing first brake control on a basis of a first margin which is a margin to collision with the object and performing second brake control on a basis of a second margin which is a margin to collision smaller than the first margin, wherein:

the vehicle control section performs the second brake control on condition that at the time point when the distance determination section determines that the distance to the object is the predetermined short distance, the first brake control has been performed or there is a history of the first brake control having been ended within the last predetermined time.

10. The vehicle control device according to claim 9, wherein:

the vehicle control section does not perform the second brake control in a case where at the time point when the distance determination section determines that the distance to the object is the predetermined short distance, the first brake control has not been performed and there is no history of the first brake control having been ended within the last predetermined time.

11. The vehicle control device according to claim 9, further comprising:

a pedestrian determination section which determines whether the object is a pedestrian, the vehicle control section permitting execution of the second brake control when it is determined that the object is a pedestrian.

12. A vehicle control method comprising the steps of:

generating a fusion target by fusion of first target information on an object ahead of an own vehicle and second target information on the object, the first target information being acquired as a reflected wave of a carrier wave, the second target information being acquired by image processing of an acquired image acquired by photographing a region of a predetermined range ahead of the own vehicle; and performing vehicle control of the own vehicle when time to collision with the object detected as the fusion target becomes an activation timing, the time to collision being time which elapses before the own vehicle collides with the object, the vehicle control method characterized by comprising the steps of:

determining whether a state where the object is detected with use of the fusion target has transitioned to a state where the object is detected with use of only the first target information;

determining whether a distance to the object is a predetermined short distance at which a lower end of the object goes out of the predetermined range when it is determined that the state has transitioned to the state where the object is detected with use of only the first target information; and performing the vehicle control with respect to the object when the time to collision with the object detected with use of only the first target information becomes the activation timing in a case where it is determined that the distance to the object is the predetermined short distance and not performing the vehicle control with respect to the object even when the time to collision with the object detected with use of only the first target information becomes the activation timing in a case where it is determined that the distance to the object is not the predetermined short distance.

13. A vehicle control device which generates a fusion target by fusion of first target information on an object ahead of an own vehicle and second target information on the object and performs vehicle control of the own vehicle with respect to the object detected as the fusion target, the first target information being acquired as a reflected wave of a carrier wave, the second target information being acquired by image processing of an acquired image of a region ahead of the own vehicle, the vehicle control device characterized by comprising:

a state determination section which determines whether a state where the object is detected with use of the fusion target has transitioned to a state where the object is detected with use of only the first target information;

a distance determination section which determines whether a distance to the object is a predetermined short distance when the state determination section determines that the state has transitioned to the state where the object is detected with use of only the first target information;

a vehicle control section which performs the vehicle control with respect to the object when the distance determination section determines that the distance to the object is the predetermined short distance; and a lateral position acquisition section which acquires a lateral position of the object in a vehicle width direction, in a case where the lateral position of the object in the vehicle width direction acquired by the lateral position acquisition section is a predetermined approaching state with respect to the own vehicle at a time point when it is determined that the distance to the object is the predetermined short distance, the vehicle control section performing the vehicle control with respect to the object, in a case where the state where the object has been detected as the fusion target transitions to the state where the object is detected with use of only the first target information, the lateral position acquisition section acquiring a first lateral position of the object in the vehicle width direction with use of the fusion target generated immediately before the transition and acquiring a second lateral position of the object in the vehicle width direction with use of the first target information acquired immediately after the transition, the vehicle control section not performing the vehicle control with respect to the object when a difference between the first lateral position and the second lateral position is not less than a predetermined value.

14. A vehicle control device which generates a fusion target by fusion of first target information on an object ahead of an own vehicle and second target information on the object and performs vehicle control of the own vehicle with respect to the object detected as the fusion target, the first target information being acquired as a reflected wave of a carrier wave, the second target information being acquired by image processing of an acquired image of a region ahead of the own vehicle, the vehicle control device characterized by comprising:

a state determination section which determines whether a state where the object is detected with use of the fusion target has transitioned to a state where the object is detected with use of only the first target information;

a distance determination section which determines whether a distance to the object is a predetermined short distance when the state determination section determines that the state has transitioned to the state where the object is detected with use of only the first target information;

a vehicle control section which performs the vehicle control with respect to the object when the distance determination section determines that the distance to the object is the predetermined short distance; and a relative speed determination section which determines a relative speed between the object and the own vehicle, the vehicle control section performing the vehicle control with respect to the object on condition that the relative speed between the object and the own vehicle is less than a predetermined value when it is determined that the object is located at the predetermined short distance.

15. A vehicle control device which generates a fusion target by fusion of first target information on an object ahead of an own vehicle and second target information on the object and performs vehicle control of the own vehicle with respect to the object detected as the fusion target, the first target information being acquired as a reflected wave of a carrier wave, the second target information being acquired by image processing of an acquired image of a region ahead of the own vehicle, the vehicle control device characterized by comprising:

a state determination section which determines whether a state where the object is detected with use of the fusion target has transitioned to a state where the object is detected with use of only the first target information;

a distance determination section which determines whether a distance to the object is a predetermined short distance when the state determination section determines that the state has transitioned to the state where the object is detected with use of only the first target information; and a vehicle control section which performs the vehicle control with respect to the object when the distance determination section determines that the distance to the object is the predetermined short distance, regardless of whether the distance to the object is the predetermined short distance, the vehicle control with respect to the object not being performed after a predetermined time period has elapsed from when the state where the object has been detected as the fusion target has transitioned to the state where the object is detected with use of only the first target information.

16. A vehicle control device which generates a fusion target by fusion of first target information on an object ahead of an own vehicle and second target information on the object and performs vehicle control of the own vehicle with respect to the object detected as the fusion target, the first target information being acquired as a reflected wave of a carrier wave, the second target information being acquired by image processing of an acquired image of a region ahead of the own vehicle, the vehicle control device characterized by comprising:
a state determination section which determines whether a state where the object is detected with use of the fusion target has transitioned to a state where the object is detected with use of only the first target information;
a distance determination section which determines whether a distance to the object is a predetermined short distance when the state determination section determines that the state has transitioned to the state where the object is detected with use of only the first target information; and
a vehicle control section which performs the vehicle control with respect to the object when the distance determination section determines that the distance to the object is the predetermined short distance,
as the vehicle control, the vehicle control device performing first brake control on a basis of a first margin which is a margin to collision with the object and performing second brake control on a basis of a second margin which is a margin to collision smaller than the first margin,
the vehicle control section performing the second brake control on condition that at a time point when the distance determination section determines that the distance to the object is the predetermined short distance, the first brake control has been performed or there is a history of the first brake control having been ended within the last predetermined time, the vehicle control section not performing the second brake control in a case where at the time point when the distance determination section determines that the distance to the object is the predetermined short distance, the first brake control has not been performed and there is no history of the first brake control having been ended within the last predetermined time.

\* \* \* \* \*